United States Patent
Yang et al.

(10) Patent No.: US 10,699,093 B2
(45) Date of Patent: Jun. 30, 2020

(54) MOBILE TERMINAL, METHOD AND DEVICE FOR DISPLAYING FINGERPRINT RECOGNITION REGION

(71) Applicant: GUANGDONG OPPO MOBILE TELECOMMUNICATIONS CORP., LTD., Dongguan (CN)

(72) Inventors: Le Yang, Dongguan (CN); Haiping Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/853,445

(22) Filed: Dec. 22, 2017

(65) Prior Publication Data

US 2018/0314870 A1   Nov. 1, 2018

(30) Foreign Application Priority Data

Apr. 28, 2017  (CN) .......................... 2017 1 0294572

(51) Int. Cl.
*G06K 9/00*    (2006.01)
*G06F 3/0488*    (2013.01)
(Continued)

(52) U.S. Cl.
CPC ......... *G06K 9/0002* (2013.01); *G06F 3/0412* (2013.01); *G06F 3/0416* (2013.01);
(Continued)

(58) Field of Classification Search
CPC ..................................................... G06K 9/0002
(Continued)

(56) References Cited

U.S. PATENT DOCUMENTS

| 2006/0035707 A1* | 2/2006 | Nguyen | G07F 17/32 463/29 |
| 2009/0052752 A1* | 2/2009 | Monden | G06K 9/00093 382/124 |

(Continued)

FOREIGN PATENT DOCUMENTS

| CN | 104850821 A | 8/2015 |
| CN | 105117062 A | 12/2015 |

(Continued)

OTHER PUBLICATIONS

Taiwan Patent Application No. 106144463, Office Action dated Aug. 6, 2018, 8 pp.

(Continued)

*Primary Examiner* — Stephen P Coleman
(74) *Attorney, Agent, or Firm* — Lathrop GPM LLP

(57) ABSTRACT

A mobile terminal, a method and a device for displaying a fingerprint recognition region are provided. The method is applied to a mobile terminal including a processor, a touch display screen and a fingerprint recognition apparatus, in which a fingerprint recognition region of the fingerprint recognition apparatus includes a first region of the touch display screen. The method may include: determining a second region when an operation for the mobile terminal satisfies a condition for inputting a fingerprint, in which the second region is in a range of the first region; and enabling a fingerprint recognition function of the fingerprint recognition apparatus in the second region, and highlighting the second region.

20 Claims, 7 Drawing Sheets

(51) Int. Cl.
*G06F 21/32* (2013.01)
*G06F 3/041* (2006.01)

(52) U.S. Cl.
CPC ............ *G06F 3/0488* (2013.01); *G06F 21/32* (2013.01); *G06F 2203/04104* (2013.01); *G06K 9/0008* (2013.01)

(58) Field of Classification Search
USPC ........................................................ 382/125
See application file for complete search history.

(56) References Cited

U.S. PATENT DOCUMENTS

| | | | | |
|---|---|---|---|---|
| 2013/0251338 | A1* | 9/2013 | Abecassis | H04N 5/445 386/241 |
| 2015/0177884 | A1* | 6/2015 | Han | G06F 3/044 345/174 |
| 2015/0235098 | A1 | 8/2015 | Lee et al. | |
| 2016/0246396 | A1* | 8/2016 | Dickinson | G06F 3/03545 |
| 2016/0253538 | A1 | 9/2016 | Lu et al. | |

FOREIGN PATENT DOCUMENTS

| | | |
|---|---|---|
| CN | 105159506 A | 12/2015 |
| CN | 105184129 A | 12/2015 |
| CN | 105488464 A | 4/2016 |
| CN | 106022073 A | 10/2016 |
| CN | 106030471 A | 10/2016 |
| CN | 106569358 A | 4/2017 |
| CN | 107122116 A | 9/2017 |
| CN | 107179871 A | 9/2017 |
| TW | 201604705 A | 2/2016 |
| TW | 1549068 B | 9/2016 |

OTHER PUBLICATIONS

European Patent Application No. 17207379.3, Extended Search and Opinion dated Jun. 22, 2018, 9 pages.
PCT/CN2017/115479 English translation of the International Search Report and Written Opinion dated Mar. 12, 2018, 10 pages.
Chinese Patent Application No. 201710294572.9, Office Action dated Apr. 8, 2019, 8 pages.
Chinese Patent Application No. 201710294572.9, English translation of Office Action dated Apr. 8, 2019, 9 pages.

* cited by examiner

MOBILE TERMINAL, METHOD AND DEVICE FOR DISPLAYING FINGERPRINT RECOGNITION REGION

CROSS-REFERENCE TO RELATED APPLICATIONS

This application is based on and claims priority of Chinese Patent Application No. 201710294572.9, filed on Apr. 28, 2017, the entire contents of which are incorporated herein by reference.

TECHNICAL FIELD

The present disclosure relates to a mobile terminal technology field, and more particularly relates to a mobile terminal, a method and a device for displaying a fingerprint recognition region.

BACKGROUND

With a popularization of smartphones, the smartphones can support more and more applications and have increasingly powerful functions. The smartphones are developed towards diversification and individuation, thereby becoming an indispensable part in human's life. More and more researches show that a key for reducing system power consumption and improving effectiveness lies in how to run software and how to use the smartphones by users.

At present, the smartphone generally adopts a fingerprint authentication solution. A fingerprint recognition apparatus of a phone is typically set in an independent region such as Home button at lower side of a screen or a rear cover of the phone. When an authentication is performed on the phone based on a fingerprint, the user needs to touch or press the fingerprint recognition region by the front side of a finger having the fingerprint, such that the fingerprint recognition apparatus may collect fingerprint data and finish the authentication when a fingerprint data matching succeeds.

SUMMARY

Embodiments of the present disclosure provide a mobile terminal, a method and a device for displaying a fingerprint recognition region.

Embodiments of the present disclosure provide a mobile terminal. The mobile terminal may include a processor, a touch display screen and a fingerprint recognition apparatus, in which a fingerprint recognition region of the fingerprint recognition apparatus includes a first region of the touch display screen. The processor is configured to determine a second region when an operation for the mobile terminal satisfies a condition for inputting a fingerprint, in which the second region is in a range of the first region. The processor is further configured to enable a fingerprint recognition function of the fingerprint recognition apparatus in the second region, and to highlight the second region.

Embodiments of the present disclosure provide a method for displaying a fingerprint recognition region, the method is applied to a mobile terminal including a processor, a touch display screen and a fingerprint recognition apparatus, in which a fingerprint recognition region of the fingerprint recognition apparatus includes a first region of the touch display screen. The method may include: determining a second region when an operation for the mobile terminal satisfies a condition for inputting a fingerprint, in which the second region is in a range of the first region; and enabling a fingerprint recognition function of the fingerprint recognition apparatus in the second region, and highlighting the second region.

Embodiments of the present disclosure provide a mobile terminal including one or more processors, a touch display screen, a fingerprint recognition apparatus, a memory and one or more programs, in which a fingerprint recognition region of the fingerprint recognition apparatus includes a first region of the touch display screen, the one or more programs are stored in the memory and executed by the one or more processors. The one or more programs include instructions for performing following acts: determining a second region when an operation for the mobile terminal satisfies a condition for inputting a fingerprint, in which the second region is in a range of the first region; and enabling a fingerprint recognition function of the fingerprint recognition apparatus in the second region, and highlighting the second region.

Embodiments of the present disclosure provide a device for displaying a fingerprint recognition region. The device has functions for realizing behaviors of the mobile terminal mentioned in the method described above. The functions may be realized by hardware or corresponding software executed by the hardware. The hardware or the software may include one or more modules corresponding to the above functions.

Embodiments of the present disclosure provide a computer readable storage medium having computer programs for exchanging digital data stored thereon, in which the computer programs are executed to cause the computer to perform all or a part of acts of the method according to the second aspect of embodiments of the present disclosure.

Embodiments of the present disclosure provide a computer program product including a non-transitory computer-readable medium storing computer programs, in which the computer programs are executed to cause the computer to perform all or a part of acts of the method according to the second aspect of embodiments of the present disclosure. The computer program product may be a program installation package.

BRIEF DESCRIPTION OF THE DRAWINGS

In order to make the technical solutions of embodiments of the present invention more clearly, the accompanying drawings used in the description of embodiments of the present invention are briefly described hereunder. Obviously, the described drawings are merely some embodiments of present invention. For persons skilled in the art, other drawings may be obtained based on these drawings without any creative work.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Terms such as "first", "second" and the like used in the specification, in claims and in drawings are configured herein for distinguishing different subjects, but not for showing a particular sequence. Furthermore, the terms such as "include", "comprise" and any other variations thereof are intended to be non-exclusive. For example, a process, a method, a system, a product or a device including or comprising a sequence of blocks or units is not limited to include or comprise the listed blocks or unit, instead, they alternatively further include or comprise other blocks and units that are not listed or alternatively further include inherent blocks or units of the process, the method, the system, the product or the device.

Term such as "embodiments" referred in the present disclosure means that, particular features, structures and characteristics described in combination with embodiments may be covered in at least one embodiment of the present disclosure. Usages of the term for many times in the specification are not necessary to refer to a same embodiment or same embodiments, and they are not independent embodiments mutually exclusive with other embodiments or unimportant embodiments. It may be explicitly or implicitly understood by those skilled in the art that, embodiments described herein can be combined with other embodiments.

The mobile terminal described in embodiments of the present disclosure may include various devices having a wireless communication functions, such as a portable device, a vehicle-mounted device, a wearable device, a computing device or other processing devices coupled to a wireless modem, and various forms of user equipments (UEs), mobile stations (MSs), terminal devices and the like. For ease of description, the above-mentioned devices are collectively referred to as mobile terminal. Embodiments of the present disclosure will be described in detail hereinafter.

In order to have a better understanding of the mobile terminal, the method and the device for displaying a fingerprint recognition region provided by embodiments of the present disclosure, embodiments of the present invention are described in detail hereinafter.

Figure 1:
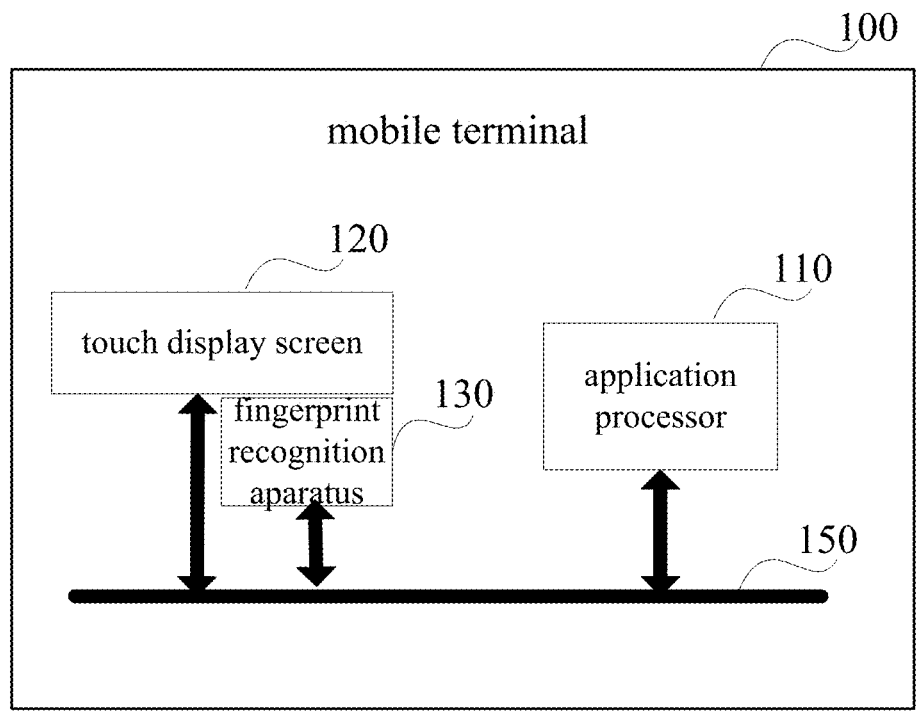
FIG. 1 is a structure diagram of a mobile terminal according to an embodiment of the present disclosure.

Referring to FIG. 1, FIG. 1 is a structure diagram of a mobile terminal 100 according to an embodiment of the present disclosure. The mobile terminal 100 may include: an application processor (AP) 110, a touch display screen 120 and a fingerprint recognition apparatus 130. The fingerprint recognition apparatus 130 is coupled to the touch display screen 120, and a fingerprint recognition region of the fingerprint recognition apparatus 130 is at a first region of the touch display screen 120. The AP 110 is coupled to the touch display screen 120 and the fingerprint recognition apparatus 130 via a bus 150. The processor 110 is configured to determine a second region when an operation for the mobile terminal satisfies a condition for inputting a fingerprint, in which the second region is in a range of the first region. The processor 110 is further configured to enable a fingerprint recognition function of the fingerprint recognition apparatus in the second region, and to highlight the second region.

In embodiments of the present disclosure, it can be seen that the fingerprint recognition region of the fingerprint recognition apparatus includes the first region of the touch display screen. When an operation for the mobile terminal satisfies the condition for inputting a fingerprint, the mobile terminal is configured to determine the second region, in which the second region is in a range of the first region. The mobile terminal is further configured to enable the fingerprint recognition function of the fingerprint recognition apparatus in the second region, and to highlight the second region. Therefore, when the mobile terminal detects that an operation for the mobile terminal satisfies the condition for inputting a fingerprint, the mobile terminal may determine the second region in the first region supporting the fingerprint recognition function, and the fingerprint recognition function of the fingerprint recognition apparatus is only enabled in the second region without enabling the fingerprint recognition function in the whole first region, such that power consumption of the mobile terminal may be reduced. At the same time, the second region may be highlighted to guide the user to input the fingerprint in the second region, so as to improve accuracy and speed for inputting fingerprint in the mobile terminal.

In some possible implementations, the processor 110 is further configured to determine the second region by determining the second region according to a random strategy.

Therefore, in this embodiment, the fingerprint recognition region of the fingerprint recognition apparatus includes the first region of the touch display screen. When an operation for the mobile terminal satisfies the condition for inputting a fingerprint, the mobile terminal is configured to determine the second region according to a random strategy. The mobile terminal is further configured to enable the fingerprint recognition function of the fingerprint recognition apparatus in the second region, and to highlight the second region. Thus, on one hand, power consumption of the mobile terminal may be reduced, and accuracy and speed for inputting the fingerprint in the mobile terminal may be improved; on the other hand, the fingerprint recognition function of the fingerprint recognition apparatus may be enabled in respective regions equiprobably according to embodiments of the present disclosure, and the regions may be highlighted equiprobably, such that non-uniform consumption of material for the fingerprint recognition caused by repeatedly enabling the fingerprint recognition function in a same region and non-uniform consumption of luminescent material due to repeatedly highlighting a same region, which may further lead to an unsatisfied screen displaying effect, may be avoided.

In some possible implementations, the processor 110 is further configured to determine the second region by: acquiring N regions determined continuously for N times before detecting the operation for the mobile terminal, where N is a positive integer; and determining the second region based on the N regions, in which the second region is different from each of the N regions.

Therefore, in this embodiment, the fingerprint recognition region of the fingerprint recognition apparatus in the mobile terminal includes the first region of the touch display screen. When an operation for the mobile terminal satisfies the condition for inputting a fingerprint, the mobile terminal is configured to acquire N regions determined continuously for N times before detecting the operation for the mobile terminal, and to determine the second region based on the N regions, in which the second region is different from each of the N regions. The mobile terminal is further configured to enable the fingerprint recognition function of the fingerprint recognition apparatus in the second region, and to highlight the second region. Thus, on one hand, power consumption of the mobile terminal may be reduced, and accuracy and speed for inputting the fingerprint in the mobile terminal may be improved; on the other hand, the fingerprint recognition function of the fingerprint recognition apparatus may be enabled in respective regions equiprobably according to embodiments of the present disclosure, while the regions are highlighted equiprobably, such that non-uniform consumption of material for the fingerprint recognition caused by repeatedly enabling the fingerprint recognition function in a same region and a non-uniform consumption of luminescent material due to repeatedly highlighting a same region, which may lead to an unsatisfied screen displaying effect, may be avoided.

In some possible implementations, the processor 110 is further configured to highlight the second region by: acquiring first brightness of the touch display screen; and setting brightness of the second region as second brightness according to the first brightness. The second brightness is brighter than the first brightness, and the second region having the second brightness is configured to guide a user to input the fingerprint in the second region.

Therefore, in this embodiment, after the fingerprint recognition function of the fingerprint recognition apparatus in the second region is enabled, the mobile terminal may highlight the second region according to the brightness of the touch display screen, so as to guide the user to input the fingerprint in the second region, thereby improving accuracy and speed for inputting the fingerprint.

In some possible implementations, the processor 110 is further configured to highlight the second region by: controlling the touch display screen to display prompt information in the second region for instructing a user to input the fingerprint in the second region. The prompt information includes a preset image or a fingerprint input box.

Therefore, in this embodiment, after the fingerprint recognition function of the fingerprint recognition apparatus in the second region is enabled, the mobile terminal may display a human-machine interface in the second region to remind the user of inputting the fingerprint. The human-machine interface may include a preset image or a fingerprint input box. The preset image may be an example fingerprint image for instructing the user to input the fingerprint in the second region.

In some possible implementations, the touch display screen 120 is configured to acquire a touch operation for the second region. The fingerprint recognition apparatus 130 is configured to collect fingerprint data and to send the fingerprint data to the processor. The processor 110 is further configured to perform a matching between the fingerprint data collected and pre-stored fingerprint template data, and to perform a preset operation when the fingerprint data collected matches with the pre-stored fingerprint template data.

In embodiments of the present disclosure, when an operation for the mobile terminal satisfies the condition for inputting a fingerprint, the mobile terminal is configured to determine the second region, in which the second region is in a range of the first region. The mobile terminal is further configured to enable the fingerprint recognition function of the fingerprint recognition apparatus in the second region, and to highlight the second region. In other words, when the mobile terminal detects that an operation for the mobile terminal satisfies the condition for inputting a fingerprint, the mobile terminal may determine the second region in the first region supporting the fingerprint recognition function, and the fingerprint recognition function of the fingerprint recognition apparatus is only enabled in the second region, and the user may be guided to perform the operation to input the fingerprint, such that power consumption of the mobile terminal may be reduced, and accuracy and speed for inputting fingerprint in the mobile terminal may be improved at the same time.

In some possible implementations, the fingerprint data collected comprises capacitance values obtained by a pixel array of the fingerprint recognition apparatus. The fingerprint recognition apparatus 130 is further configured to generate a three-dimensional surface according to the capacitance values. The processor 110 is further configured to simulate an image of the fingerprint according to the three-dimensional surface and to control the touch display screen to display the image of the fingerprint.

Figure 2:
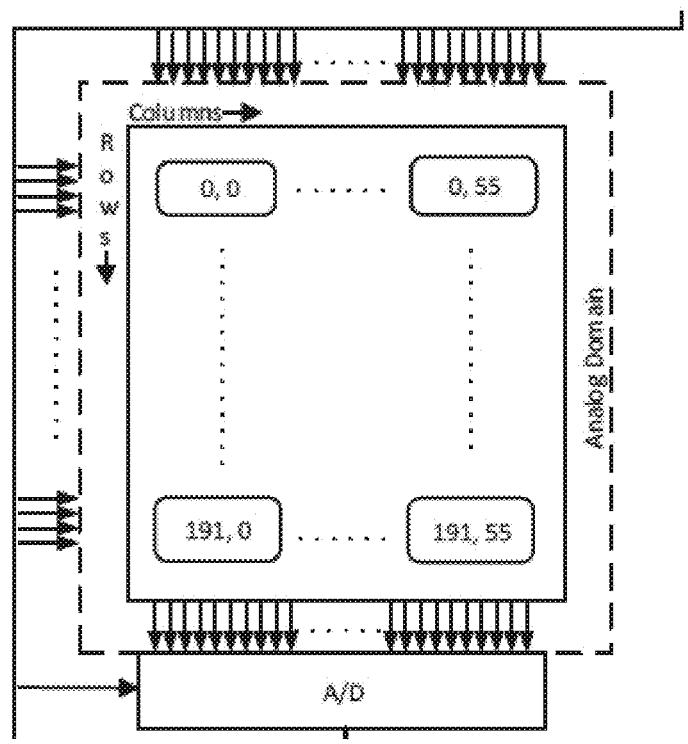
FIG. 2 is a schematic diagram of a pixel array according to an embodiment of the present disclosure.

The features of fingerprint include overall features and partial features. The overall features include the features the user can observer by eyes, including basic fingerprint pattern, such as loop, arch and whorl. The partial features include breakpoints, bifurcations and turning points occurring in the fingerprint, since the fingerprint is not smooth. The fingerprint image can be obtained by a pixel array in the fingerprint recognition apparatus 130. As illustrated in FIG. 2, the pixel array is an array of 56*192. When a finger presses the fingerprint recognition apparatus 130, each pixel may generate a capacitance value. The capacitance values vary with ridges and valleys of the fingerprint, since the ridges is close to the pixel while the valley is far away the pixel. The fingerprint recognition apparatus 130 can generate a three-dimensional surface according to the capacitance values. By simulating the three-dimensional surface, the image of fingerprint can be generated.

Figure 3:
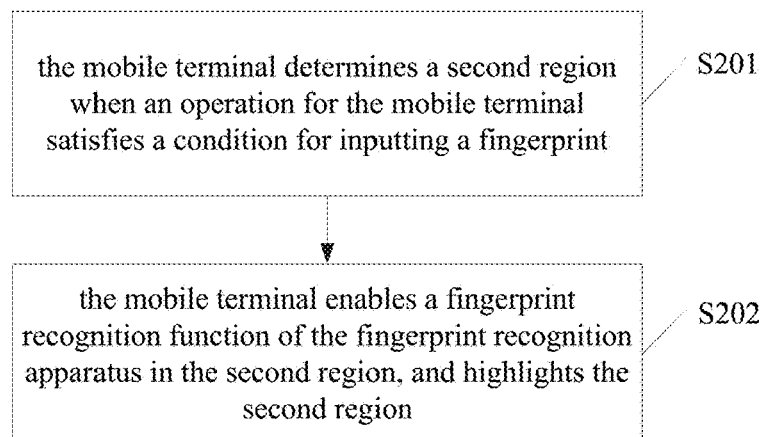
FIG. 3 is a schematic flow chart of a method for displaying a fingerprint recognition region according to an embodiment of the present disclosure.

Referring to FIG. 3, FIG. 3 is a schematic flow chart of a method for displaying a fingerprint recognition region according to an embodiment of the present disclosure. The method is applied to a mobile terminal including a processor, a touch display screen and a fingerprint recognition apparatus, and a fingerprint recognition region of the fingerprint recognition apparatus includes a first region of the touch display screen. As illustrated in FIG. 3, the method for displaying a fingerprint recognition region according to embodiments of the present disclosure may include followings.

At block S201, a second region is determined by the mobile terminal when an operation for the mobile terminal satisfies a condition for inputting a fingerprint, in which the second region is in a range of the first region.

Figure 4:
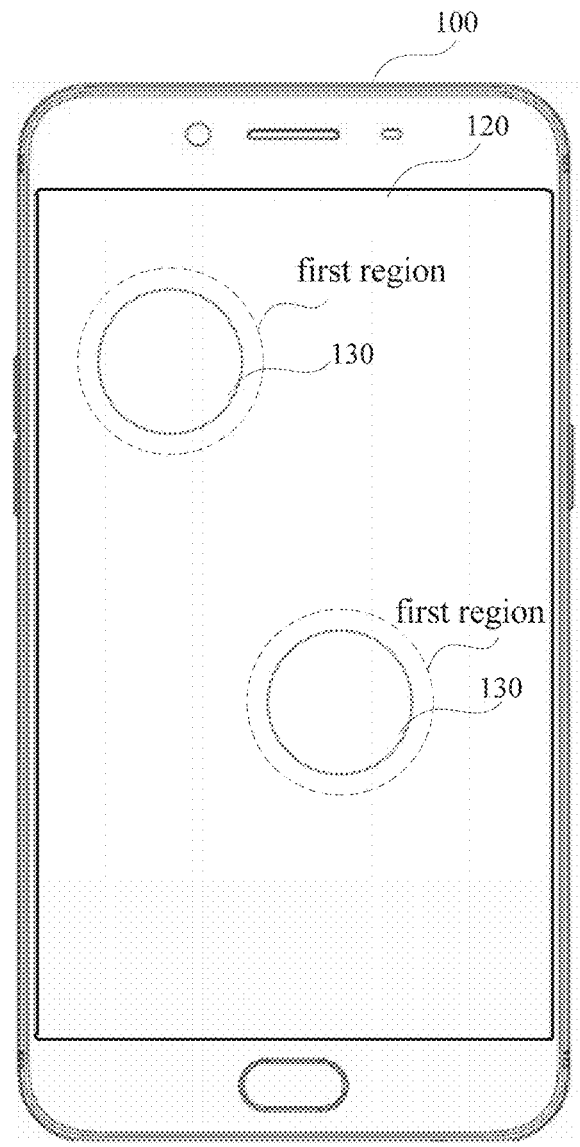
FIG. 4 is a schematic diagram illustrating positions of a first region including two preset regions on a touch display screen according to an embodiment of the present disclosure.
Figure 5:
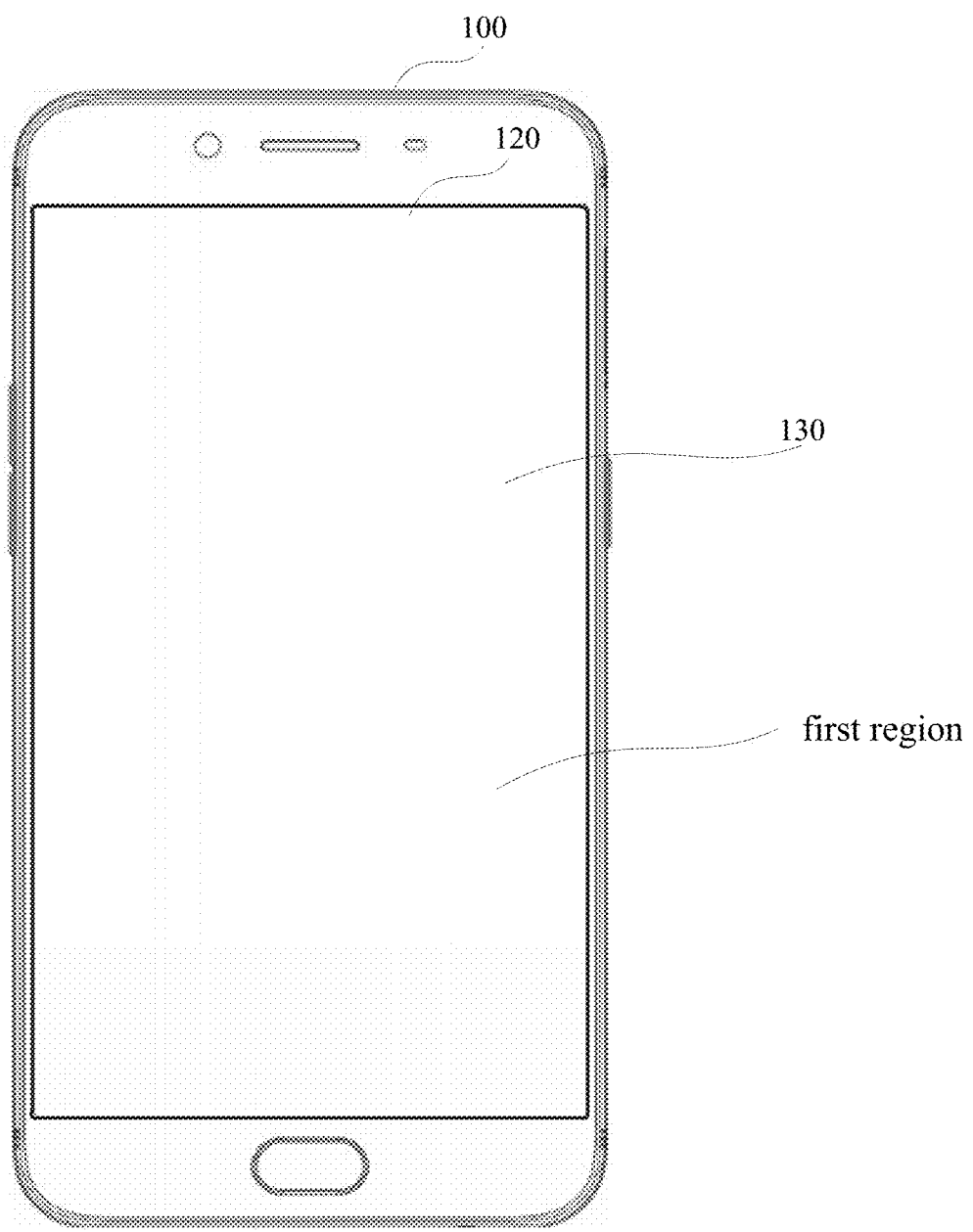
FIG. 5 is a schematic diagram illustrating a display region of a touch display screen as a first region according to an embodiment of the present disclosure.

As illustrated in FIG. 4, the mobile terminal 100 may include the touch display screen 120 and the fingerprint recognition apparatus 130, a fingerprint recognition region of the fingerprint recognition apparatus 130 of the mobile terminal 100 may include a first region of the touch display screen 120. The first region may include at least two preset regions (as illustrated in FIG. 4, FIG. 4 is a schematic diagram illustrating positions of a first region including two preset regions on a touch display screen according to an embodiment of the present disclosure), and the preset regions may be located on an upper left part of the touch display screen, or on an upper part, a lower part, a left part or a right part of the touch display screen, which will not be limited in embodiments of the present disclosure. In some possible embodiments, the first region may be configured as a display region of the touch display screen 120. Referring to FIG. 5, FIG. 5 is a schematic diagram illustrating a display region of a touch display screen as a first region according to an embodiment of the present disclosure.

In some possible embodiments, the touch display screen 120 may include a touch screen and a display screen, the touch screen and the display screen are arranged in a stack and the display screen is located underneath the touch screen. The fingerprint recognition apparatus 130 includes a fingerprint sensor, and the fingerprint sensor may include at least one of an optical fingerprint sensor, a capacitive fingerprint sensor and an ultrasonic fingerprint sensor.

In a case that the fingerprint sensor is the capacitive fingerprint sensor and the touch screen included in the touch display screen is a capacitive screen, the fingerprint recognition apparatus may be coupled to the touch display screen in following manner: the fingerprint recognition apparatus is integrated to the touch display screen. In an embodiment, a first induction capacitor array in the fingerprint recognition apparatus may be embedded in a second induction capacitor array in the touch display screen, in which induction capacitors in the first induction capacitor array are distributed uniformly in the first region.

In a case that the fingerprint sensor is the optical fingerprint sensor, the fingerprint recognition apparatus may be coupled to the touch display screen in following manner: the fingerprint recognition apparatus is integrated to the touch display screen, the fingerprint recognition apparatus in the mobile terminal may collect users' fingerprint data based on a pinhole imaging principle. A spacer layer between the touch screen and the display screen included in the touch display screen is provided with a first pinhole array layer at a first preset region. A uniformly-distributed pinhole array is formed at a second preset region when a drive circuit layer of the display screen is printed. The pinhole array uniformly distributed on the drive circuit layer is regarded as a second pinhole array layer, and pinholes of the first pinhole array layer have a one-to-one correspondence with those of the second pinhole array layer. The optical fingerprint sensor may include a charge coupled device (CCD) array layer configured to detect light passing through the first pinhole array layer and the second pinhole array layer. The first preset region and the second preset region correspond to the first region respectively.

In a case that the fingerprint sensor is the ultrasonic fingerprint sensor, the fingerprint recognition apparatus may be coupled to the touch display screen in following manner: a vacuum detecting cavity is set below the first region of the touch display screen, a plurality of ultrasonic sensors are distributed uniformly in the vacuum detecting cavity. The ultrasonic sensor includes an ultrasonic signal transmitter and an ultrasonic signal receiver. The ultrasonic signal transmitter is configured to transmit signal at a certain frequency to detect the user's fingerprint, and the ultrasonic signal receiver is configured to receive an echo signal reflected. An operating principle of the ultrasonic sensor is explained as follows, by using a capacity of penetrating materials of ultrasonic waves, different echo signals may be generated according to different materials, for example, when the ultrasonic wave reaches surfaces of different materials, the ultrasonic wave may be absorbed and reflected to different extents, such that positions of ridge and valley of fingerprint may be detected.

The display screen may be a thin film transistor-liquid crystal display (TFT-LCD), a light emitting diode (LED) display, an organic light-emitting diode (OLED) display and the like.

At block S202, the mobile terminal enables a fingerprint recognition function of the fingerprint recognition apparatus in the second region, and highlights the second region.

In a case that the fingerprint sensor is the capacitive fingerprint sensor and the touch screen included in the touch display screen is a capacitive screen, the induction capacitor array in the fingerprint recognition apparatus in the second region may be enabled by the mobile terminal, so as to enable the fingerprint recognition function of the fingerprint recognition apparatus in the second region.

In a case that the fingerprint sensor is the optical fingerprint sensor, the mobile terminal may enable a charge coupled device (CCD) array layer of the optical fingerprint sensor in the second region, so as to detect light passing through the first pinhole array layer and the second pinhole array layer, thereby enabling the fingerprint recognition function of the fingerprint recognition apparatus in the second region.

In a case that the fingerprint sensor is the ultrasonic fingerprint sensor, the mobile terminal may enable an ultrasonic sensor in the vacuum detecting cavity set below the second region, thereby enabling the fingerprint recognition function of the fingerprint recognition apparatus in the second region.

In embodiments of the present disclosure, it can be seen that the fingerprint recognition region of the fingerprint recognition apparatus in the mobile terminal includes the first region of the touch display screen. When an operation for the mobile terminal satisfies the condition for inputting a fingerprint, the mobile terminal is configured to determine the second region, in which the second region is in a range of the first region. The mobile terminal is further configured to enable the fingerprint recognition function of the fingerprint recognition apparatus in the second region, and to highlight the second region. Therefore, when the mobile terminal detects that an operation for the mobile terminal satisfies the condition for inputting a fingerprint, the mobile terminal may determine the second region in the first region supporting the fingerprint recognition function, and the fingerprint recognition function of the fingerprint recognition apparatus is only enabled in the second region without enabling the fingerprint recognition function in the whole first region, such that power consumption of the mobile terminal may be reduced. At the same time, the second region may be highlighted to guide the user to input the fingerprint in the second region, so as to improve accuracy and speed for inputting fingerprint in the mobile terminal.

In some possible embodiments, determining the second region may include: determining the second region according to a random strategy.

Figure 6:
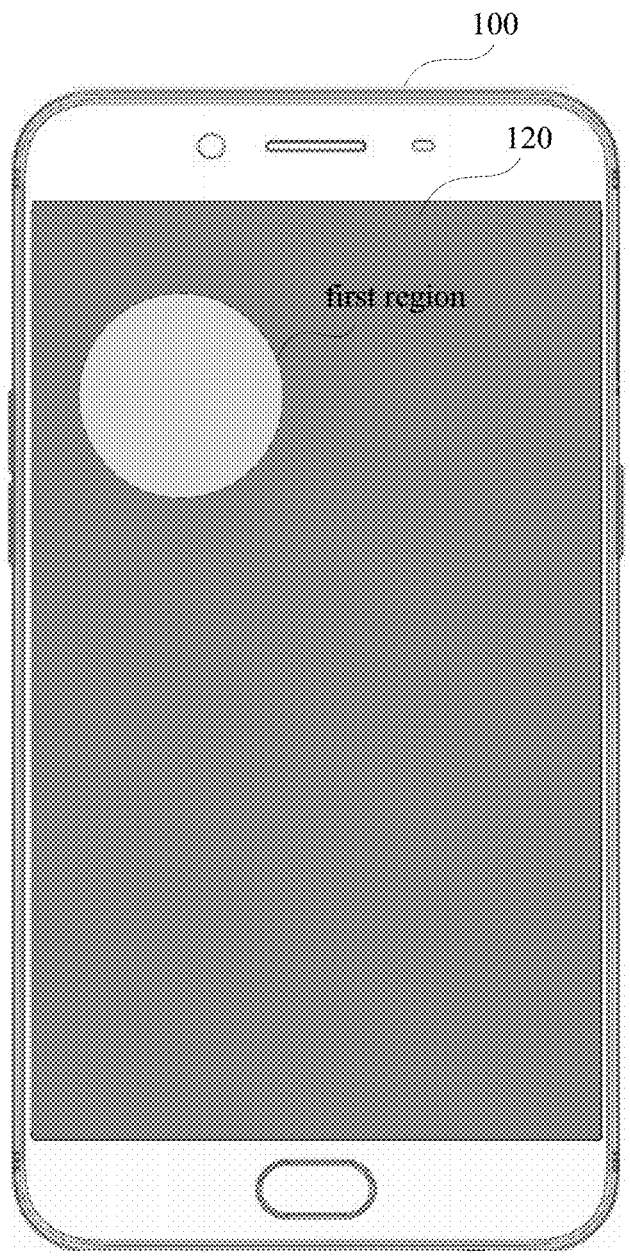
FIG. 6 is a schematic diagram illustrating a second region according to an embodiment of the present disclosure.

As illustrated in FIG. 6, the mobile terminal 100 determines a region randomly from the first region supporting the fingerprint recognition function as the second region. According to a theory of statistics, as the second region is determined randomly, within a certain number of times, the possibilities of regions in a range of the first region being determined as the second region are equivalent, such that the fingerprint recognition function of the fingerprint recognition apparatus may be enabled in each region with an equivalent possibility, and each region may be highlighted with an equivalent possibility.

Therefore, in this embodiment, the fingerprint recognition region of the fingerprint recognition apparatus in the mobile terminal includes the first region of the touch display screen. When an operation for the mobile terminal satisfies the condition for inputting a fingerprint, the mobile terminal is configured to determine the second region according to a random strategy. The mobile terminal is further configured to enable the fingerprint recognition function of the fingerprint recognition apparatus in the second region, and to highlight the second region. Thus, on one hand, power consumption of the mobile terminal may be reduced, and accuracy and speed for inputting the fingerprint in the mobile terminal may be improved; on the other hand, fingerprint recognition functions of the fingerprint recognition apparatus may be enabled in respective regions equiprobably according to embodiments of the present disclosure, and the regions may be highlighted equiprobably, such that non-uniform consumption of material for the fingerprint recognition caused by repeatedly enabling the fingerprint recognition function in a same region and a non-uniform consumption of luminescent material due to repeatedly highlighting a same region which may lead to an unsatisfied screen displaying effect may be avoided.

In some possible embodiments, determining the second region may include: acquiring N regions determined continuously for N times before detecting the operation for the mobile terminal, where N is a positive integer; and determining the second region based on the N regions, in which the second region is different from each of the N regions.

In some embodiments, the mobile terminal 100 may determine N regions for N times continuously before detecting the operation for the mobile terminal so as to determine the second region, such that the possibilities of regions in a range of the first region being determined as the second region are equivalent, the fingerprint recognition function of the fingerprint recognition apparatus may be enabled in each region with an equivalent possibility, and each region may be highlighted with an equivalent possibility. For example, when N=9, the mobile terminal 100 may determine the second region according to 9 regions determined for 9 times continuously before detecting the operation for the mobile terminal, the second region is different from each of the 9 regions, such that it can be realized that the regions in which the fingerprint recognition function is enabled by the mobile terminal within the closest 10 times may be different, and the regions to be highlighted may be different.

Therefore, in this embodiment, the fingerprint recognition region of the fingerprint recognition apparatus in the mobile terminal includes the first region of the touch display screen. When an operation for the mobile terminal satisfies the condition for inputting a fingerprint, the mobile terminal is configured to acquire N regions determined for N times continuously before detecting the operation for the mobile terminal, and to determine the second region based on the N regions, in which the second region is different from each of the N regions. The mobile terminal is further configured to enable the fingerprint recognition function of the fingerprint recognition apparatus in the second region, and to highlight the second region. Thus, on one hand, power consumption of the mobile terminal may be reduced, and accuracy and speed for inputting fingerprint in the mobile terminal may be improved; on the other hand, the fingerprint recognition function of the fingerprint recognition apparatus may be enabled in respective regions equiprobably according to embodiments of the present disclosure, and the regions are highlighted equiprobably, such that non-uniform consumption of material for the fingerprint recognition caused by repeatedly enabling the fingerprint recognition function in a same region and a non-uniform consumption of luminescent material due to repeatedly highlighting a same region which may lead to an unsatisfied screen displaying effect may be avoided.

In some possible embodiments, highlighting the second region may include: acquiring first brightness of the touch display screen; and setting brightness of the second region as second brightness according to the first brightness. The second brightness is brighter than the first brightness, and the second region having the second brightness is configured to guide a user to input the fingerprint in the second region.

Therefore, in this embodiment, the mobile terminal may highlight the second region according to brightness of the touch display screen after the fingerprint recognition function of the fingerprint recognition apparatus is enabled in the second region, so as to guide the user to input the fingerprint in the second region, thereby improving accuracy and speed for inputting the fingerprint.

In some possible implementations, highlighting the second region may include controlling the touch display screen to display prompt information in the second region for instructing a user to input the fingerprint in the second region. The prompt information includes a preset image or a fingerprint input box.

Therefore, in this embodiment, after the fingerprint recognition function of the fingerprint recognition apparatus in the second region is enabled, the mobile terminal may display a human-machine interface in the second region to remind the user of inputting the fingerprint. The human-machine interface may include a preset image or a fingerprint input box. The preset image may be an example fingerprint image for instructing the user to input the fingerprint in the second region.

In some possible embodiments, the method may also include: acquiring a touch operation for the second region; collecting fingerprint data; and performing a matching between the fingerprint data collected and pre-stored fingerprint template data, and performing a preset operation when the fingerprint data collected matches with the pre-stored fingerprint template data.

In some possible implementations, the fingerprint data collected comprises capacitance values obtained by a pixel array of the fingerprint recognition apparatus. The method further includes: generating a three-dimensional surface according to the capacitance values; simulating an image of the fingerprint according to the three-dimensional surface; and controlling the touch display screen to display the image of the fingerprint.

The features of fingerprint include overall features and partial features. The overall features include the features the user can observer by eyes, including basic fingerprint pattern, such as loop, arch and whorl. The partial features include breakpoints, bifurcations and turning points occurring in the fingerprint, since the fingerprint is not smooth. The fingerprint image can be obtained by a pixel array in the fingerprint recognition apparatus 130. As illustrated in FIG. 2, the pixel array is an array of 56*192. When a finger presses the fingerprint recognition apparatus 130, each pixel may generate a capacitance value. The capacitance values vary with ridges and valleys of the fingerprint, since the ridges is close to the pixel while the valley is far away the pixel. The fingerprint recognition apparatus 130 can generate a three-dimensional surface according to the capacitance values. By simulating the three-dimensional surface, the image of fingerprint can be generated.

Figure 7:
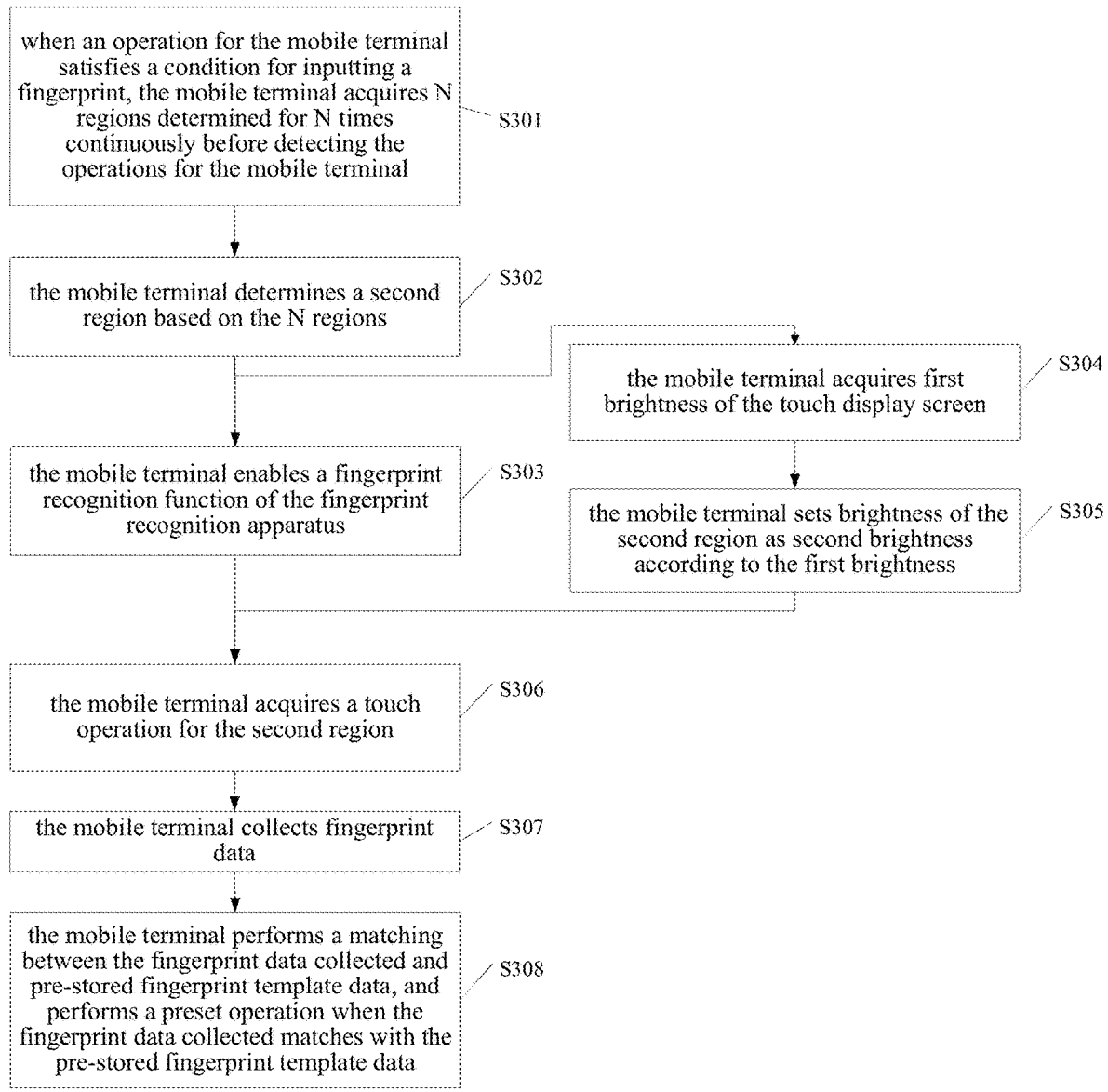
FIG. 7 is a schematic flow chart of a method for displaying a fingerprint recognition region according to another embodiment of the present disclosure.

In accordance with the embodiment illustrated in FIG. 3, referring to FIG. 7, FIG. 7 is a schematic flow chart of a method for displaying a fingerprint recognition region according to another embodiment of the present disclosure. The method for displaying a fingerprint recognition region according to another embodiment of the present disclosure may be applied to a mobile terminal including a touch display screen and a fingerprint recognition apparatus, and a fingerprint recognition region of the fingerprint recognition apparatus includes a first region of the touch display screen. As illustrated in FIG. 7, the method for displaying a fingerprint recognition region according to embodiments of the present disclosure may include followings.

At block S301, when an operation for the mobile terminal satisfies a condition for inputting a fingerprint, the mobile terminal acquires N regions determined for N times continuously before detecting the operation for the mobile terminal, where N is a positive integer.

At block S302, the mobile terminal determines a second region based on the N regions, in which the second region is different from each of the N regions, and the second region is in a range of the first region.

At block S303, the mobile terminal enables a fingerprint recognition function of the fingerprint recognition apparatus.

At block S304, the mobile terminal acquires first brightness of the touch display screen.

At block S305, the mobile terminal sets brightness of the second region as second brightness according to the first brightness, in which the second brightness is brighter than the first brightness, and the second region having the second brightness is configured to guide a user to input the fingerprint in the second region.

At block S306, the mobile terminal acquires a touch operation for the second region.

At block S307, the mobile terminal collects fingerprint data.

At block S308, the mobile terminal performs a matching between the fingerprint data collected and pre-stored fingerprint template data, and performs a preset operation when the fingerprint data collected matches with the pre-stored fingerprint template data.

In embodiments of the present disclosure, it can be seen that the fingerprint recognition region of the fingerprint recognition apparatus in the mobile terminal includes the first region of the touch display screen. When an operation for the mobile terminal satisfies the condition for inputting a fingerprint, the mobile terminal is configured to determine a second region, in which the second region is in a range of the first region. The mobile terminal is further configured to enable the fingerprint recognition function of the fingerprint recognition apparatus in the second region, and to highlight the second region. Therefore, when the mobile terminal detects that an operation for the mobile terminal satisfies the condition for inputting a fingerprint, the mobile terminal may determine the second region in the first region supporting the fingerprint recognition function, and the fingerprint recognition function of the fingerprint recognition apparatus is only enabled in the second region without enabling the fingerprint recognition function in the whole first region, such that power consumption of the mobile terminal may be reduced. At the same time, the second region may be highlighted to guide the user to input the fingerprint in the second region, so as to improve accuracy and speed for inputting fingerprint in the mobile terminal.

Figure 8:
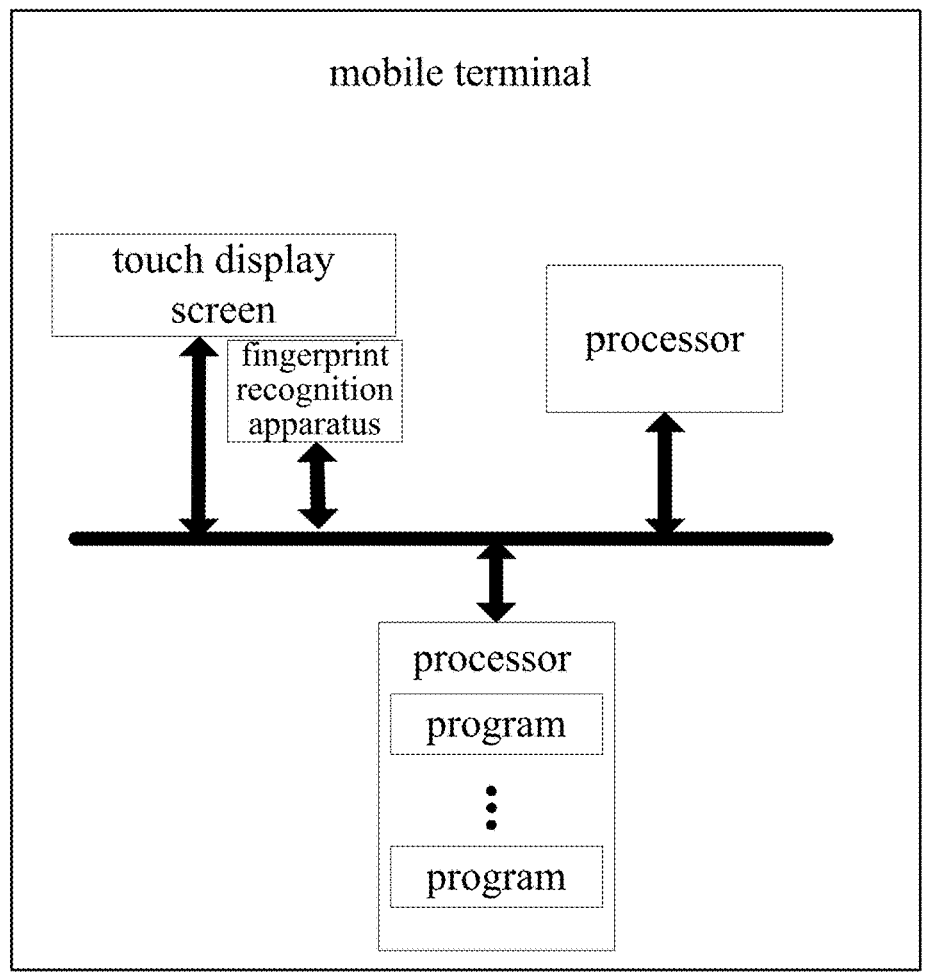
FIG. 8 is a structure diagram of a mobile terminal according to an embodiment of the present disclosure.

Referring to FIG. 8, FIG. 8 is a structure diagram of a mobile terminal according to an embodiment of the present disclosure. The mobile terminal may include: one or more processors, a touch display screen, a fingerprint recognition apparatus, a memory and one or more programs. A fingerprint recognition region of the fingerprint recognition apparatus includes a first region of the touch display screen. The one or more programs are stored in the memory and executed by the one or more processors. The one or more programs include instructions for performing following acts: determining a second region when an operation for the mobile terminal satisfies a condition for inputting a fingerprint, in which the second region is in a range of the first region; and enabling a fingerprint recognition function of the fingerprint recognition apparatus in the second region, and highlighting the second region.

In some possible implementations, the instructions are further configured to perform a following act to determine the second region: determining the second region according to a random strategy.

In some possible implementations, the instructions are further configured to perform following acts to determine the second region: acquiring N regions determined continuously for N times before detecting the operation for the mobile terminal, where N is a positive integer; and determining the second region based on the N regions, in which the second region is different from each of the N regions.

In some possible implementations, the instructions are further configured to perform following acts to highlight the second region: acquiring first brightness of the touch display screen; and setting brightness of the second region as second brightness according to the first brightness, in which the second brightness is brighter than the first brightness, and the second region having the second brightness is configured to guide a user to input the fingerprint in the second region.

In some possible implementations, the one or more programs may also include instructions for performing following acts: acquiring a touch operation for the second region; collecting fingerprint data; and performing a matching between the fingerprint data collected and pre-stored fingerprint template data, and performing a preset operation when the fingerprint data collected matches with the pre-stored fingerprint template data.

In embodiments of the present disclosure, it can be seen that the fingerprint recognition region of the fingerprint recognition apparatus in the mobile terminal includes the first region of the touch display screen. When an operation for the mobile terminal satisfies the condition for inputting a fingerprint, the mobile terminal is configured to determine a second region, in which the second region is in a range of the first region. The mobile terminal is further configured to enable the fingerprint recognition function of the fingerprint recognition apparatus in the second region, and to highlight the second region. Therefore, when the mobile terminal detects that an operation for the mobile terminal satisfies the condition for inputting a fingerprint, the mobile terminal may determine the second region in the first region supporting the fingerprint recognition function, and the fingerprint recognition function of the fingerprint recognition apparatus is only enabled in the second region without enabling the fingerprint recognition function in the whole first region, such that power consumption of the mobile terminal may be reduced. At the same time, the second region may be highlighted to guide the user to input the fingerprint in the second region, so as to improve accuracy and speed for inputting the fingerprint in the mobile terminal.

Figure 9:
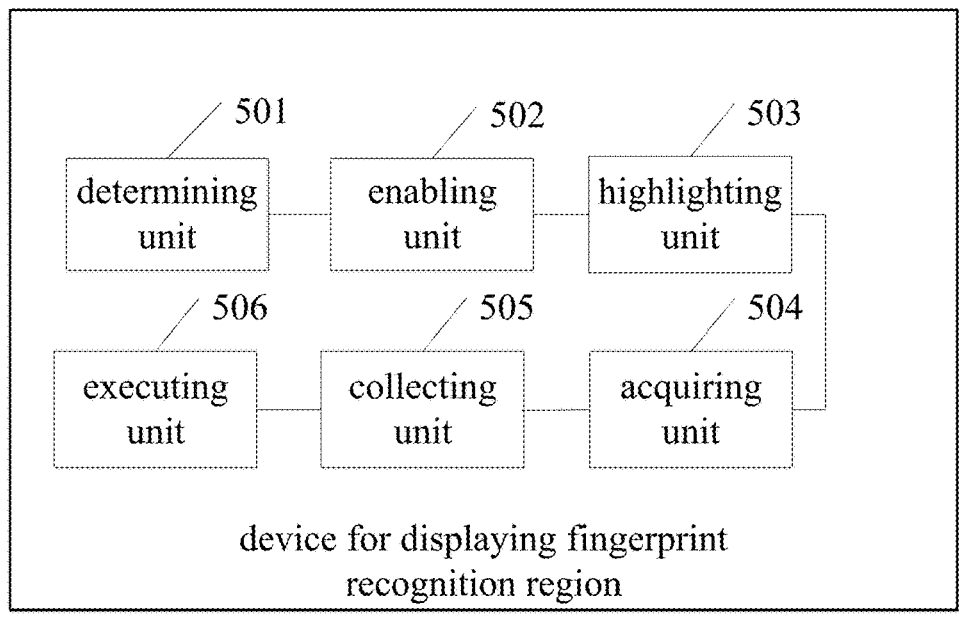
FIG. 9 is a block diagram of a device for displaying a fingerprint recognition region according to an embodiment of the present disclosure.

Referring to FIG. 9, FIG. 9 is a block diagram of a device for displaying a fingerprint recognition region according to an embodiment of the present disclosure. The device is applied to a mobile terminal including a processor, a touch display screen and a fingerprint recognition apparatus. A fingerprint recognition region of the fingerprint recognition apparatus includes a first region of the touch display screen. As illustrated in FIG. 9, the device may include a determining unit 501, an enabling unit 502 and a highlighting unit 503.

The determining unit 501 is configured to determine a second region when an operation for the mobile terminal satisfies a condition for inputting a fingerprint, in which the second region is in a range of the first region.

The enabling unit 502 is configured to enable a fingerprint recognition function of the fingerprint recognition apparatus in the second region.

The highlighting unit 503 is configured to highlight the second region.

In some possible embodiments, the determining unit 501 is further configured to determine the second region according to a random strategy.

In some possible embodiments, the determining unit 501 is further configured to acquire N regions determined continuously for N times before detecting the operation for the mobile terminal, where N is a positive integer; and to determine the second region based on the N regions, in which the second region is different from each of the N regions.

In some possible embodiments, the highlighting unit 503 is further configured to acquire first brightness of the touch display screen; and to set brightness of the second region as second brightness according to the first brightness, in which the second brightness is brighter than the first brightness, and the second region having the second brightness is configured to guide a user to input the fingerprint in the second region.

In some possible embodiments, the device may also include: an acquiring unit 504, configured to acquire a touch operation for the second region; a collecting unit 505, configured to collect fingerprint data; and an executing unit 506, configured to perform a matching between the fingerprint data collected and pre-stored fingerprint template data, and to perform a preset operation when the fingerprint data collected matches with the pre-stored fingerprint template data.

Regarding specific implementations of the above-mentioned units, reference may be made to the description of relative acts in embodiments corresponding to FIG. 3 and FIG. 7, which will not described in detail here.

It should be noted that the mobile terminal described in embodiments of the present disclosure may be represented in a form of a functional unit. The term "unit" used herein should be understood with a broadest meaning, and objects configured to realize functions of each "unit" may be, for example, an integrated circuit ASIC, a single circuit, a processor (a common processor or a specialized processor or a chipset) configured to execute one or more software programs or firmware programs and memory, a combinational logic circuit and/or other suitable components for realizing above functions.

For example, the function of the determining unit 501 for determining the second region when an operation for the mobile terminal satisfies a condition for inputting a fingerprint may be realized by the mobile terminal illustrated in FIG. 8. In detail, it may be realized by the processor calling executable program codes stored in the memory, so as to determine the second region when the operation for the mobile terminal satisfies the condition for inputting the fingerprint.

In embodiments of the present disclosure, it can be seen that the fingerprint recognition region of the fingerprint recognition apparatus in the mobile terminal includes the first region of the touch display screen. When an operation for the mobile terminal satisfies the condition for inputting a fingerprint, the mobile terminal is configured to determine a second region, in which the second region is in a range of the first region. The mobile terminal is further configured to enable the fingerprint recognition function of the fingerprint recognition apparatus in the second region, and to highlight the second region. Therefore, when the mobile terminal detects that an operation for the mobile terminal satisfies the condition for inputting a fingerprint, the mobile terminal may determine the second region in the first region supporting the fingerprint recognition function, and the fingerprint recognition function of the fingerprint recognition apparatus is only enabled in the second region without enabling the fingerprint recognition function in the whole first region, such that power consumption of the mobile terminal may be reduced. At the same time, the second region may be highlighted to guide the user to input the fingerprint in the second region, so as to improve accuracy and speed for inputting fingerprint in the mobile terminal.

Figure 10:
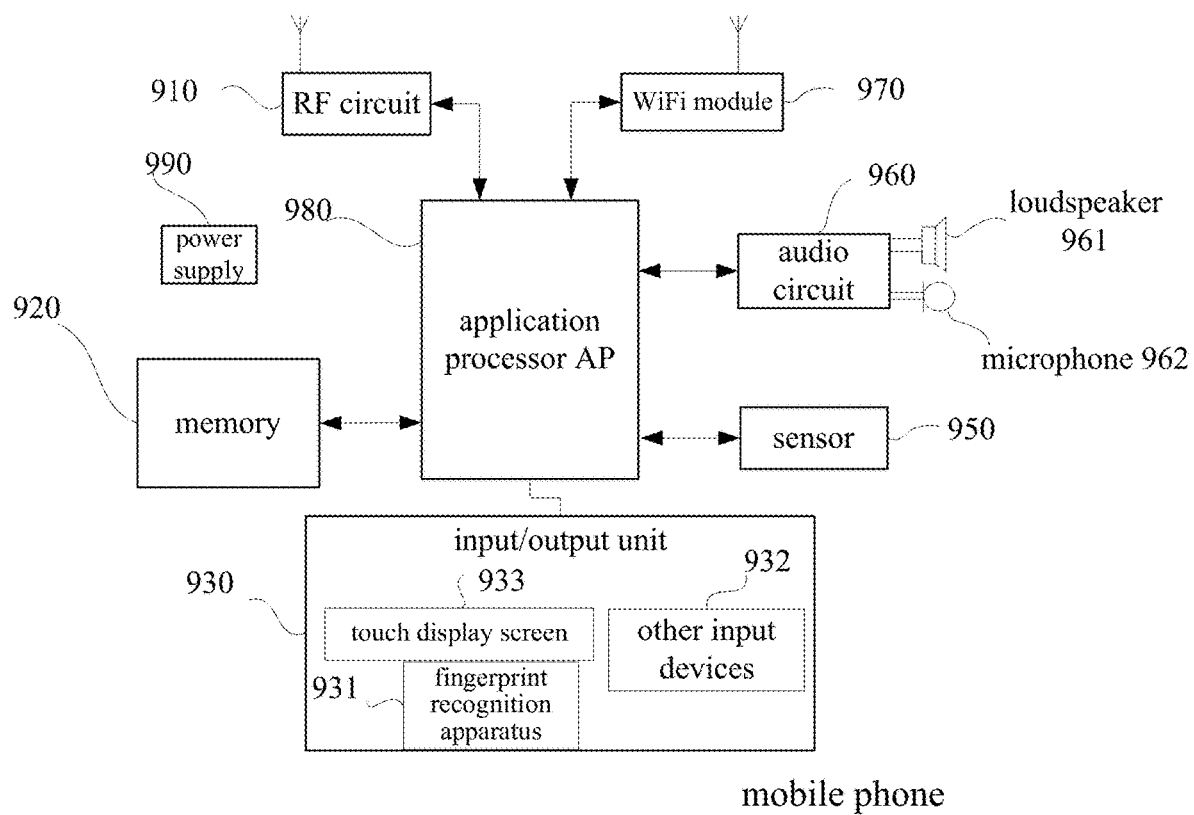
FIG. 10 is a structure diagram of a mobile terminal according to an embodiment of the present disclosure.

Embodiments of the present disclosure also provide another mobile terminal, as illustrated in FIG. 10. For convenience of description, only parts relative with embodiments of the present disclosure are illustrated, regarding specific technical details which are not disclosed, reference can be made to the description of the method embodiments. The mobile terminal may include a mobile phone, a tablet computer, a PDA (Personal Digital Assistant), a POS (Point of Sales), a vehicle-mounted computer and the like. The present disclosure takes the mobile phone as an example.

FIG. 10 illustrates a structure diagram of a mobile phone relative to the mobile terminal provided by embodiments of the present disclosure. Referring to FIG. 10, the mobile phone may include a radio frequency (RF) circuit 910, a memory 920, an input unit 930, a sensor 950, an audio circuit 960, a wireless fidelity (WiFi) module 970, an application processor (AP) 980, and a power supply 990. It will be understood by those skilled in the art that the terminal structure illustrated in FIG. 10 does not constitute a limitation on the mobile phone. Compared to the drawing illustrated, more or fewer components may be included, and a combination of some components or different component arrangements may also be possible.

Respective components of the mobile phone will be described in detail with reference to FIG. 10.

The input unit 930 may be configured to receive input digital or character information, and generate key signal input relative to user's setting and functional control of the mobile phone. In some embodiments, the input unit 930 may include a touch display screen 933, a fingerprint recognition apparatus 931 and other input devices 932. The fingerprint recognition apparatus 931 is coupled to the touch display screen 933, and a fingerprint recognition region of the fingerprint recognition apparatus 931 is at a first region of the touch display screen 933. The input unit 930 may also include other input devices 932. In detail, other input devices 932 may include but not be limited to one or more of a physical button, a functional button (such as a volume control button, an ON-OFF button and the like), a trackball, a mouse and a joystick.

The AP 980 is a control center of the mobile phone, configured to use various interfaces and wiles to couple respective parts of the mobile phone, to perform various functions and process data of the mobile phone by running or executing software programs and/or modules stored in the memory 920 and calling data stored in the memory 920, so as to monitor the mobile phone overall. In an embodiment, the AP 980 may include one or more processing units. For example, the AP 980 may integrate an application processor and a modem processor, in which the application processor is mainly configured to process the operating system, the user interface and applications, and the modem processor is mainly configured to process wireless communication. It could be understood that the above-described modem processor may be not integrated in the AP 980.

The memory 920 may be configured to store Android system and a screen locking application. The Android system includes a FingerService and a power management service (PSM). The memory 920 may include a high-speed random access memory, and may also include a non-transitory medium, such as at least one disk storage element, a flash storage element or other transitory solid state storage element.

The radio frequency circuit 910 may be configured to receive and send information. Generally, the radio frequency circuit 910 includes, but is not limited to, an antenna, at least one amplifier, a transceiver, a coupler, a low noise amplifier (LNA), and a duplexer. In addition, the radio frequency circuit 910 may also communicate with another device by wireless communication and a network. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The mobile phone may also include at least one sensor 950, such as an optical sensor, a motion sensor, and other sensors. In detail, the optical sensor may include an ambient light sensor and a proximity sensor. The ambient light sensor can adjust luminance of the touch display screen according to brightness of the ambient light. The proximity sensor may switch off the touch display screen and/or backlight when the mobile phone is moved to the ear. As one type of motion sensor, an accelerometer sensor may be enumerated. The accelerometer sensor can detect magnitude of accelerations in various directions (generally on three axes), may detect magnitude and a direction of the gravity in a static state, and may be applied to an application that recognizes the attitude of the mobile phone (for example, switching between landscape orientation and portrait orientation, a related game, and magnetometer attitude calibration) and a function related to vibration recognition (such as a pedometer and a knock), and the like. Other sensors, such as a gyroscope, a barometer, a hygrometer, a thermometer, and an infrared sensor can be configured in the mobile phone, which are not further described herein.

The audio circuit 960, a loudspeaker 960, and a microphone 962 may provide audio interfaces between the user and the mobile phone. The audio circuit 960 may convert received audio data into an electric signal and transmit the electric signal to the loudspeaker 961. The loudspeaker 961 converts the electric signal into a sound signal for outputting. On the other hand, the microphone 962 converts a collected sound signal into an electric signal. The audio circuit 960 receives the electric signal and converts the electric signal into audio data, and outputs the audio data to the AP 980 for processing. Then, the processor sends the audio data to, for example, another terminal device by using the radio frequency circuit 910, or outputs the audio data to the memory 920 for further processing.

WiFi is a short distance wireless transmission technology. The mobile phone may help, by using the WiFi module 970, the user to receive and send e-mails, browse a webpage, access streaming media, and so on, which provides wireless broadband Internet access for the user. Although the WiFi module 970 is illustrated in FIG. 10, it could be understood that the WiFi module is unessential and may be omitted when required, as long as the scope of the essence of the present disclosure is not changed.

The mobile phone further includes the power supply (such as a battery) 990 for supplying power to the components. The power supply may be logically coupled with the AP 980 by using a power management system, thereby implementing functions such as charging, discharging and power consumption management by using the power management system.

Although not illustrated in the figure, the mobile phone may further include a camera, a Bluetooth module, and the like, which is not further described herein.

In aforementioned embodiments of FIG. 3 and FIG. 7, method steps may be realized based on the structure of the mobile phone.

In aforementioned embodiments of FIG. 9, functions of the units may be realized based on the structure of the mobile phone.

Embodiments of the present disclosure also provide a computer readable storage medium having computer programs for exchanging digital data stored thereon, in which the computer programs are executed to cause a computer to perform all or a part of acts of the method according to the method embodiments of the present disclosure.

Embodiments of the present disclosure also provide a computer program product including a non-transitory computer-readable medium storing computer programs, in which the computer programs are executed to cause a computer to perform all or a part of acts of the method according to the method embodiments of the present disclosure.

It should be noted that, for convenience and simplicity of description, the above method embodiments are described in a form of a combination of a series of steps. However, those skilled in the art can understand clearly that, the present disclosure is not limited by the order of the steps, since some steps according to present disclosure may be performed simultaneously or in other orders. In addition, those skilled in the art can understand clearly that, the described embodiments are preferred embodiments, of which relative steps or modules may be unnecessary for the present disclosure.

In above embodiments, each embodiment may be described focusing on different aspects. Regarding parts not be described in some embodiments, reference may be made to relative descriptions in other embodiments.

It should be understood that, the system, devices and method disclosed in several embodiments provided by the present disclosure can be realized in any other manner. For example, the device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

It should be understood that all or a part of the method provided by the present disclosure may be realized by programs instructing relative hardware, the programs may be stored in a computer-readable memory. The memory may include a flash disk, an ROM, an RAM, a magnet disk, a light disk and the like.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A mobile terminal, comprising a processor, a touch display screen and a fingerprint recognition apparatus, wherein a fingerprint recognition region of the fingerprint recognition apparatus comprises a first region of the touch display screen, and
    the processor is configured to determine a second region when an operation for the mobile terminal satisfies a condition for inputting a fingerprint, the second region being in a range of the first region; and
    the processor is further configured to only enable a fingerprint recognition function of the fingerprint recognition apparatus in the second region without enabling the fingerprint recognition function in the first region excluding the second region, and to highlight the second region after the second region is determined, wherein the processor is further configured to determine the second region by:
        determining the second region according to a random strategy causing the range of the second region within the first region to differ between a first instance of the operation and a second instance of the operation.

2. The mobile terminal according to claim 1, wherein the processor is further configured to determine the second region by:
    acquiring N regions determined continuously for N times before detecting the operation for the mobile terminal, where N is a positive integer; and
    determining the second region based on the N regions, in which the second region is different from each of the N regions.

3. The mobile terminal according to claim 1, wherein the processor is further configured to highlight the second region by:
    acquiring first brightness of the touch display screen; and
    setting brightness of the second region as second brightness according to the first brightness, in which the second brightness is brighter than the first brightness, and the second region having the second brightness is configured to guide a user to input the fingerprint in the second region.

4. The mobile terminal according to claim 1, wherein possibilities of regions in a range of the first region being determined as the second region are equivalent, the fingerprint recognition function of the fingerprint recognition apparatus is enabled in each region with an equivalent possibility, and each region is highlighted with an equivalent possibility.

5. The mobile terminal according to claim 1, wherein, the processor is further configured to highlight the second region by:
    controlling the touch display screen to display prompt information in the second region for instructing a user to input the fingerprint in the second region.

6. The mobile terminal according to claim 5, wherein, the prompt information comprises at least one of a preset image and a fingerprint input box.

7. The mobile terminal according to claim 1, wherein,
    the touch display screen is configured to acquire a touch operation for the second region;
    the fingerprint recognition apparatus is configured to collect fingerprint data and to send the fingerprint data to the processor; and
    the processor is further configured to perform a matching between the fingerprint data collected and pre-stored fingerprint template data, and to perform a preset operation when the fingerprint data collected matches with the pre-stored fingerprint template data.

8. The mobile terminal according to claim 7, wherein, the fingerprint data collected comprises capacitance values obtained by a pixel array of the fingerprint recognition apparatus;
    the fingerprint recognition apparatus is further configured to generate a three-dimensional surface according to the capacitance values; and
    the processor is further configured to simulate an image of the fingerprint according to the three-dimensional surface and to control the touch display screen to display the image of the fingerprint.

9. A method for displaying a fingerprint recognition region, applied to a mobile terminal comprising a processor, a touch display screen and a fingerprint recognition apparatus, wherein a fingerprint recognition region of the fingerprint recognition apparatus comprises a first region of the touch display screen, and the method comprises:

determining a second region when an operation for the mobile terminal satisfies a condition for inputting a fingerprint, the second region being in a range of the first region; and enabling a fingerprint recognition function of the fingerprint recognition apparatus in the second region only, without enabling the fingerprint recognition function in the first region excluding the second region, and highlighting the second region after the second region is determined, wherein determining the second region comprises:

determining the second region according to a random strategy causing the range of the second region within the first region to differ between a first instance of the operation and a second instance of the operation.

10. The method according to claim 9, wherein determining the second region comprises:

acquiring N regions determined continuously for N times before detecting the operation for the mobile terminal, where N is a positive integer; and determining the second region based on the N regions, in which the second region is different from each of the N regions.

11. The method according to claim 9, wherein highlighting the second region comprises:

acquiring first brightness of the touch display screen; and setting brightness of the second region as second brightness according to the first brightness, in which the second brightness is brighter than the first brightness, and the second region having the second brightness is configured to guide a user to input the fingerprint in the second region.

12. The method according to claim 9, wherein possibilities of regions in a range of the first region being determined as the second region are equivalent, the fingerprint recognition function of the fingerprint recognition apparatus is enabled in each region with an equivalent possibility, and each region is highlighted with an equivalent possibility.

13. The method according to claim 9, wherein highlighting the second region comprises:

controlling the touch display screen to display prompt information in the second region for instructing a user to input the fingerprint in the second region.

14. The method according to claim 13, wherein, the prompt information comprises at least one of a preset image and a fingerprint input box.

15. The method according to claim 9, further comprising:

acquiring a touch operation for the second region;

collecting fingerprint data; and performing a matching between the fingerprint data collected and pre-stored fingerprint template data, and performing a preset operation when the fingerprint data collected matches with the pre-stored fingerprint template data.

16. The method according to claim 15, wherein, the fingerprint data collected comprises capacitance values obtained by a pixel array of the fingerprint recognition apparatus;

the method further comprises:

generating a three-dimensional surface according to the capacitance values;

simulating an image of the fingerprint according to the three-dimensional surface; and controlling the touch display screen to display the image of the fingerprint.

17. A device for displaying a fingerprint recognition region, applied to a mobile terminal comprising a touch display screen and a fingerprint recognition apparatus, wherein a fingerprint recognition region of the fingerprint recognition apparatus comprises a first region of the touch display screen, and the device comprises a non-transitory computer-readable medium comprising computer-executable instructions stored thereon, and an instruction execution system which is configured by the instructions to implement at least one of:

determining a second region when an operation for the mobile terminal satisfies a condition for inputting a fingerprint, the second region being in a range of the first region;

enabling a fingerprint recognition function of the fingerprint recognition apparatus in the second region only, without enabling the fingerprint recognition function in the first region excluding the second region; and highlighting the second region after the second region is determined, wherein the instruction execution system determines the second region by performing an act of:

determining the second region according to a random strategy causing the range of the second region within the first region to differ between a first instance of the operation and a second instance of the operation.

18. The device according to claim 17, wherein the instruction execution system determines the second region by performing acts of:

acquiring N regions determined continuously for N times before detecting the operation for the mobile terminal, where N is a positive integer; and determining the second region based on the N regions, in which the second region is different from each of the N regions.

19. The device according to claim 17, wherein the instruction execution system highlights the second region by performing acts of:

acquiring first brightness of the touch display screen; and setting brightness of the second region as second brightness according to the first brightness, in which the second brightness is brighter than the first brightness, and the second region having the second brightness is configured to guide a user to input the fingerprint in the second region.

20. The device according to claim 17, wherein possibilities of regions in a range of the first region being determined as the second region are equivalent, the fingerprint recognition function of the fingerprint recognition apparatus is enabled in each region with an equivalent possibility, and each region is highlighted with an equivalent possibility.

* * * * *